United States Patent [19]
Mac Collum

[11] Patent Number: 5,784,195
[45] Date of Patent: Jul. 21, 1998

[54] BINOCULAR LENS PROTECTOR

[76] Inventor: M. S. Mac Collum, 126 E. Desert Park La., Phoenix, Ariz. 85020

[21] Appl. No.: 699,554

[22] Filed: Aug. 19, 1996

[51] Int. Cl.$^6$ .................................. G02B 11/04; F41G 1/02
[52] U.S. Cl. ........................ 359/511; 359/507; 33/244
[58] Field of Search ........................... 359/507, 509, 359/511–513, 600, 611–612; 206/316.1–316.2; 33/244; 215/306

[56] References Cited

U.S. PATENT DOCUMENTS

| | | | |
|---|---|---|---|
| 1,367,692 | 2/1921 | Ginnecy et al. | 215/306 |
| 1,710,109 | 4/1929 | Paulus et al. | 33/244 |
| 2,212,596 | 8/1940 | Fuller | 206/80 |
| 2,514,257 | 7/1950 | Reavis | 359/511 |
| 2,720,305 | 10/1955 | Foster | 206/5 |
| 2,738,585 | 3/1956 | Vissing | 359/511 |
| 2,889,629 | 6/1959 | Darkenwald | 33/244 |
| 3,426,433 | 2/1969 | Anderson | 359/511 |
| 3,496,642 | 2/1970 | Pfahler | 359/511 |
| 3,642,345 | 2/1972 | Akin, Jr. et al. | 359/511 |
| 3,749,231 | 7/1973 | Nathan | 206/5 |
| 3,787,021 | 1/1974 | Herst | 248/316 |
| 4,557,451 | 12/1985 | Conway | 248/187 |
| 4,641,932 | 2/1987 | Harms | 359/511 |
| 4,865,191 | 9/1989 | Easter | 206/315 |
| 4,927,017 | 5/1990 | Easter | 206/316.2 |
| 5,052,550 | 10/1991 | Pfenning | 206/5 |
| 5,221,991 | 6/1993 | Webster | 359/408 |
| 5,446,953 | 9/1995 | LeFeber | 24/3.2 |

*Primary Examiner*—Thong Nguyen
*Attorney, Agent, or Firm*—Meschkow & Gresham, P.L.C.; Jordan M. Meschkow; Lowell W. Gresham

[57] ABSTRACT

A binocular lens protector (10) has a binocular lens cover (14), with a rigid support structure (18) and a resilient structure (20) joined by a bonding agent (22), and an elastic coupler (16) that is used to hold the binocular lens cover (14) firmly to a binoculars (12). Two binocular lens protectors (10), intended to protect both the objective lenses (28) and the eyepiece lenses (30) of a given binoculars (12), form a binocular lens protection set (52). Two binocular lens covers (14), intended to protect both the objective lenses (28) and the eyepiece lenses (30) of a given binoculars (12), yet attached to each other and to the binoculars (12) by a single elastic coupler (16), form a binocular lens protection system (54).

10 Claims, 4 Drawing Sheets

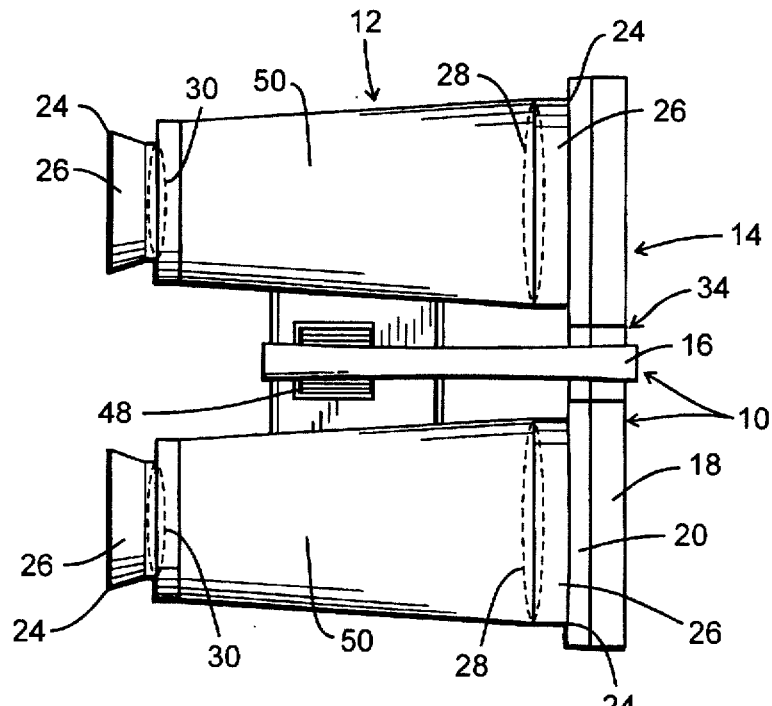
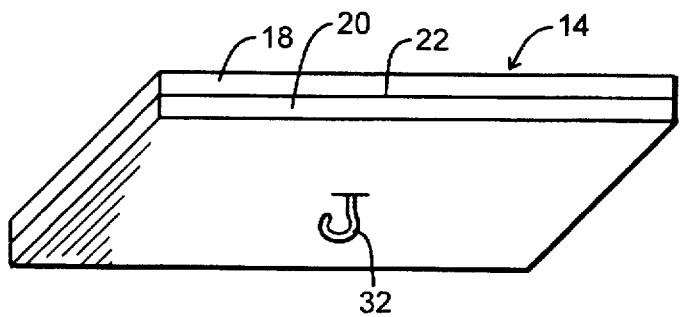
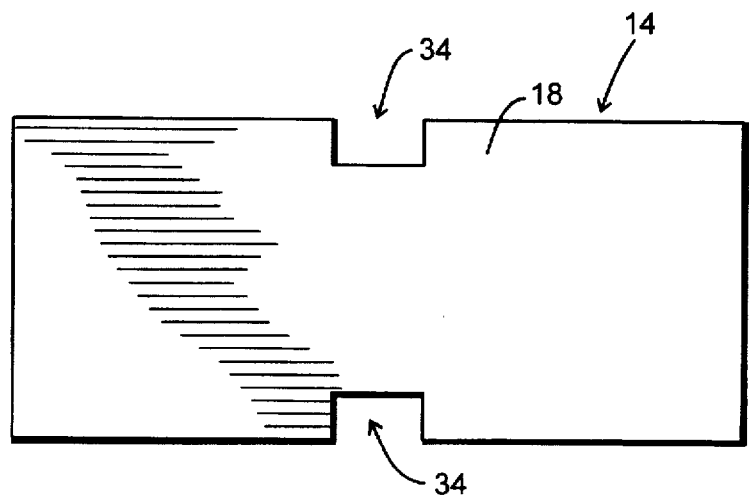
Fig. 1
Fig. 2
Fig. 3

BINOCULAR LENS PROTECTOR

BACKGROUND OF THE INVENTION

1. Technical Field of the Invention

The present invention pertains to protecting the lenses of optical viewing systems. More specifically, the present invention relates to providing protection of the lenses of binoculars.

2. Prior Art

Optical viewing systems operate best when their lenses are undamaged and have clean surfaces. When not in use, the surfaces of the lenses of optical viewing systems, more specifically, binoculars, require protection to preclude damage and to prevent the accumulation of dirt and pollutants.

Lens caps are normally used with each individual lens of binoculars to protect the lens and maintain a clean surface prior to use. A problem with lens caps is that they require a user to remove each lens cap individually prior to using the binoculars.

Another problem with lens caps is that it is necessary to hold or store the lens caps in another location until the lenses once again require protection. This constant juggling of the lens caps often leads to the loss of one or more lens caps, thus allowing one or more of the binoculars' lenses to continuously remain unprotected.

A further problem with lens caps lies in how binoculars are used. As lens caps require a certain amount of manual dexterity and time to remove and store, the time needed to remove the lens caps may lead to a lost viewing opportunity: the caps are finally off and stowed after the rare bird has flown away and the viewing opportunity has passed.

Because of this potential for lost viewing opportunities, users often remove the lens caps well before the binoculars are to be used and fail to replace the lens caps promptly after use. This practice creates an increased risk of damaged or dirty lenses.

It is also not unusual for binoculars to be used in inclement weather. As even water may be considered a foreign substance vis-à-vis modern coated optical lenses, unnecessarily exposing the lenses to inclement weather greatly increases the chances for lens damage or contamination.

What is needed is a binocular lens protector that is easy to use, thus providing for greatly reduced lens exposure, and stays with the binoculars.

SUMMARY OF THE INVENTION

Accordingly, it is an advantage of the present invention that an improved binocular lens protector facilitating ease of use is provided.

Another advantage of the present invention is that the binocular lens protector will allow a user to easily maintain lens protection until the moment the binoculars are to be used for viewing.

A further advantage of the present invention is that the binocular lens protector will preclude the loss of lens protection as the binocular lens protector is elastically coupled to the binoculars.

Still another advantage of the present invention is that the binocular lens protector covers both objective lenses or both eyepiece lenses of the binoculars.

Yet another advantage of the present invention is that the binocular lens protector is easily and instantaneously removed from both lenses in a single operation.

Briefly, to achieve the desired advantages of the present invention in accordance with a preferred embodiment thereof, a binocular lens protector is provided, which includes a binocular lens cover and an elastic coupler used to attach the binocular lens cover to the binoculars.

BRIEF DESCRIPTION OF THE FIGURES

A more complete understanding of the present invention may be derived by referring to the detailed description and claims when considered in connection with the Figures, wherein like reference numbers refer to similar items throughout the Figures, and:

FIG. 1 shows a top plan view of a "squared-8" embodiment of a binocular lens protector attached to binoculars so as to protect the objective lenses;

FIG. 2 shows an inside anisometric view of a rectilinear embodiment of a binocular lens cover portion of a binocular lens protector;

FIG. 3 shows an outside plan view of a "squared-8" embodiment of a binocular lens cover portion of a binocular lens protector;

DESCRIPTION OF THE PREFERRED EMBODIMENTS

Figure 4:
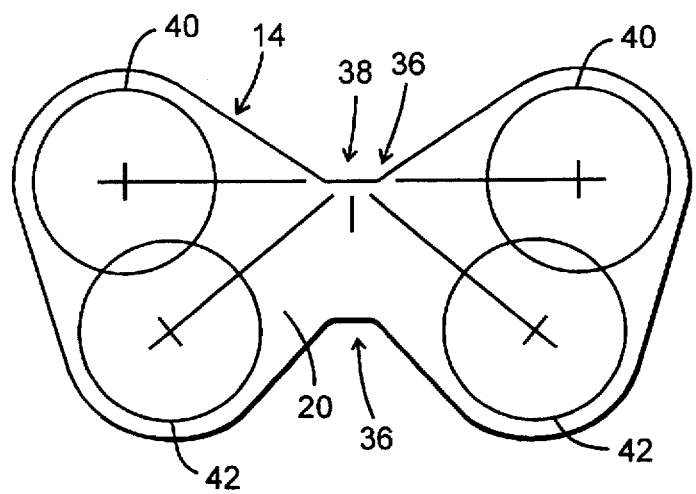
FIG. 4 shows an inside plan view of a conformal embodiment of a binocular lens cover portion of a binocular lens protector, indicating the positional relationship of the binoculars' lenses to the binocular lens cover when in protection mode.

FIG. 1 shows a top plan view of a binocular lens protector 10 in use on binoculars 12. Binocular lens protector 10 is composed of a binocular lens cover 14 and an elastic coupler 16.

FIG. 2 shows an anisometric view of a binocular lens cover 14. Binocular lens cover 14 is composed of a rigid support structure 18 coupled to a resilient structure 20 by means of a bonding agent 22.

Rigid support structure 18 is preferably a flat piece of a rigid material, such as wood, plastic, or metal. Rigid support structure 18 can also be made from other materials or combinations thereof. However, the material or combination of materials from which rigid support structure 18 is made is less important than its rigidity. Rigid support structure 18, when in the position shown in FIG. 1, referred to as a lens protection mode, should not bend so far as to have any part of resilient structure 20 lose contact with any portion of outer edges 24 of lens guards 26 of binoculars 12.

Rigid support structure 18 is at least large enough to completely cover both outer edges 24 of lens guards 26 of either objective lenses 28 or eyepiece lenses 30, whichever is to be protected, of binoculars 12 at the same time.

While rigid support structure 18 is shown in a rectangular shape in FIG. 2, other shapes are possible.

While resilient structure 20 is preferably made of some material, such as foam or felt, with sufficient resiliency to allow a seal to be made against outer edges 24 of lens guards 26 of binoculars 12, other materials or combinations thereof are also suitable. Desirably, the material or combination of materials from which resilient structure 20 is made has properties which prevent resilient structure 20 from marring the surface of lens guards 26 while simultaneously providing a substantial barrier to dirt and other contaminants that can damage or foul the surfaces of objective lenses 28 or eyepiece lenses 30, whichever is to be protected.

Resilient structure 20 normally corresponds in shape to rigid support structure 18.

The coupling between rigid support structure 18 and resilient structure 20 is accomplished by means of a bonding agent 22, such as glue. Other bonding techniques well know to those of skill in the art may be used, such as thermo-bonding and pressure bonding. The materials chosen for rigid support structure 18 and resilient structure 20 generally dictate the preferred bonding method.

FIG. 2 shows a rectilinear embodiment of a binocular lens cover 14 in an inside anisometric view. In this embodiment, binocular lens cover 14 is rectangular in shape with a central screw hook 32.

Screw hook 32 is located in the approximate center of binocular lens cover 14 and is installed by screwing or otherwise fastening through resilient structure 20 into rigid support structure 18. While screw hook 32 is shown as an open hook, a closed hook can also be used.

Figure 10:
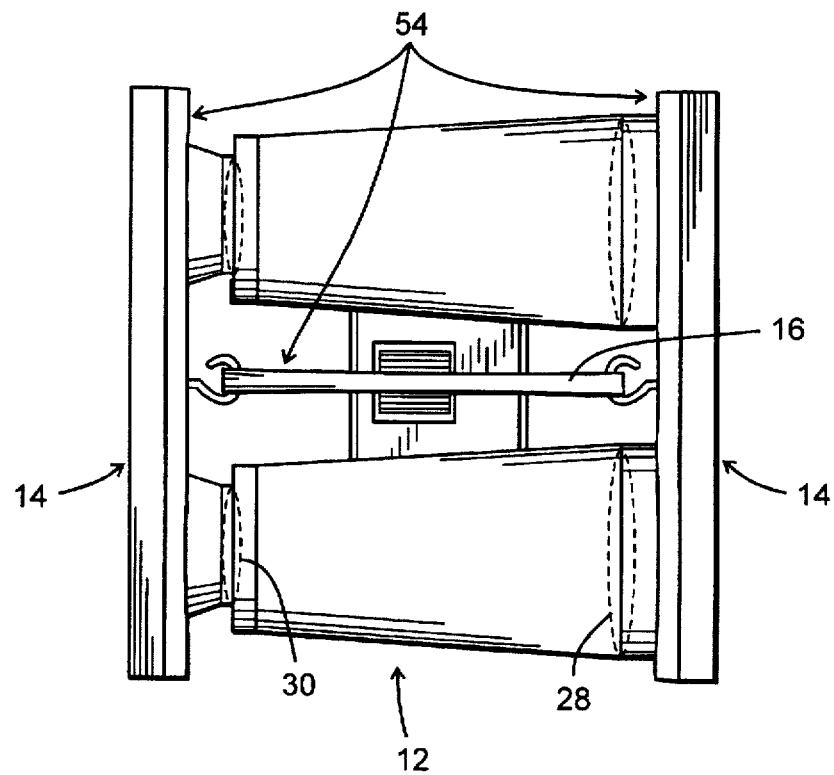
FIG. 10 shows a top plan view of a rectilinear embodiment of a binocular lens protection system attached to binoculars so as to protect both the objective lenses and the eyepiece lenses.

Screw hook 32 is used to keep elastic coupler 16 in place on binocular lens cover 14 (see FIG. 10).

Elastic coupler 16 is preferably a rubber or silicon band, but other suitable elastic articles can be used to perform the same function.

FIG. 3 shows a "squared-8" embodiment of binocular lens cover 14 in an outside plan view. In this embodiment, binocular lens cover 14 has two central notches 34, giving it the shape of a squared-off figure 8.

Central notches 34 are located approximately at the midpoints of the longer sides of binocular lens cover 14, and are used to keep elastic coupler 16 in place on binocular lens cover 14. Central notches 34 are shown squared off, but need not be.

FIG. 4 shows a conformal embodiment of binocular lens cover 14 in an inside plan view. In this embodiment, binocular lens cover 14 has a rounded shape with a distinct waist 36, which conforms to the general shape of outer edges 24 of lens guards 26 of binoculars 12.

Waist 36 is used to keep elastic coupler 16 in place on binocular lens cover 14.

Most binoculars 12 have a central axis 38 around which each half of binoculars 12 pivots through a short arc. This pivoting action is used to adjust the spacing of eyepiece lenses 30 to fit the user's eyes. The conformal embodiment shown in FIG. 3 is shaped to fit outer edges 24 of lens guards 26 of binoculars 12 whether outer edges 24 are at their position of maximal separation 40, minimal separation 42, or any position in between.

An advantage of some variations of the conformal embodiment would be that binoculars 12 may be placed into their case without removing binocular lens protector 10.

Figure 5:
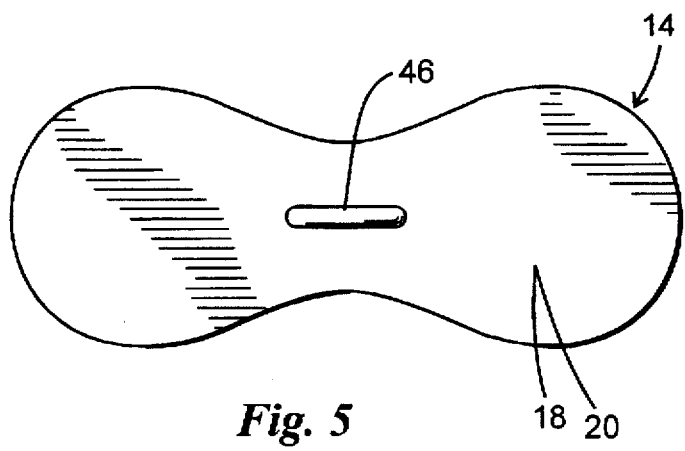
FIG. 5 shows an inside plan view of a molded contoured embodiment of a binocular lens cover portion of a binocular lens protector.
Figure 6:
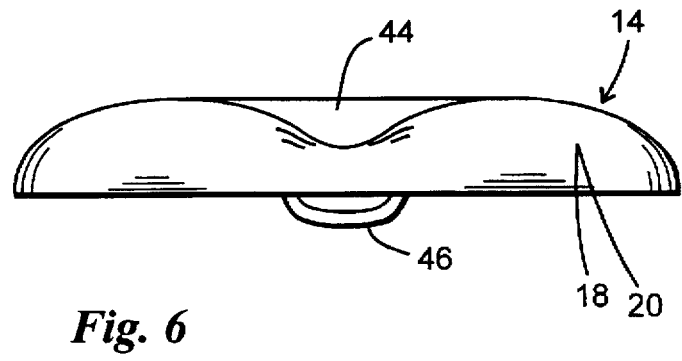
FIG. 6 shows a top plan view of a molded contoured embodiment of a binocular lens cover portion of a binocular lens protector.

FIGS. 5 and 6 show a molded embodiment of a binocular lens cover 14. In this embodiment, binocular lens cover 14 is molded from a resilient material made rigid by its form, which is comprised of curved surfaces and a central stiffening fin 44.

Since the material comprising binocular lens cover 14 is both resilient by its nature and rigid by its form, rigid support structure 18 and resilient structure 20 become one.

In this embodiment, a molded-in loop 46 serves as an attachment point for elastic coupler 16. For ease of understanding the operation of binocular lens protector 10, the "squared-8" embodiment binocular lens cover 14 and elastic coupler 16, as shown in FIGS. 1, 3, 7, and 8, is used.

Elastic coupler 16 is placed around a central mechanism 48 of binoculars 12 and over binocular lens cover 14 and into central notches 34 such that resilient structure 20 of binocular lens cover 14 is held firmly against outer edges 24 of lens guards 26 of binoculars 12 by the tension of elastic coupler 16.

FIG. 1 shows binocular lens protector 10 in this position, referred to herein as a protection mode, with objective lenses 28 of binoculars 12 fully protected. When a user wishes to use the binoculars 12, the user moves binocular lens cover 14 either up or down, as desired, away from lens guards 26 of binoculars 12.

Figure 7:
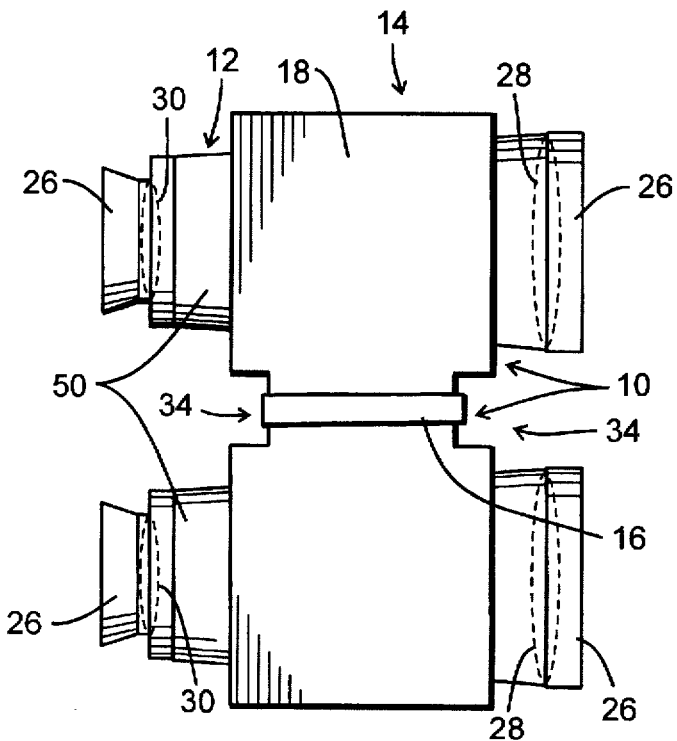
FIG. 7 shows a top plan view of a "squared-8" embodiment of a binocular lens protector attached to binoculars so as to permit viewing.

FIG. 7 shows binocular lens protector 10 in this position, referred to herein as a viewing mode, with binocular lens cover 14 remaining attached to binoculars 12 in an out-of-the-way position upon the top of the binoculars.

Figure 8:
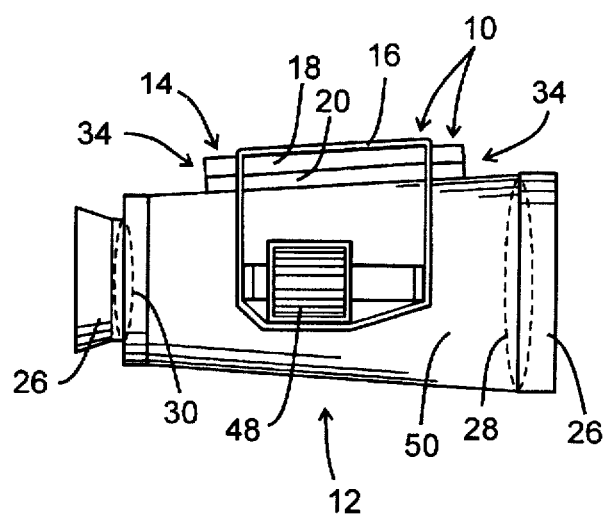
FIG. 8 shows a side plan of a "square-8" embodiment of a binocular lens protector attached to binoculars so as to permit viewing, cutaway through the center of the binoculars in order to show the path of the elastic coupler.

FIG. 8 shows binocular lens protector 10 in the viewing mode in a cutaway view through the centerline of binoculars 12, allowing the path of elastic coupler 16 around central mechanism 48 of binoculars 12 to be seen.

It is desirable for elastic coupler 16 to be of sufficient elasticity that when in the viewing mode binocular lens cover 14 will be held firmly against both bodies 50 of binoculars 12. Inclement or windy weather could cause binocular lens cover 14 to move or vibrate if not firmly held against bodies 50 of binoculars 12, and such movement or vibrations could detract from the use of binoculars 12.

Figure 9:
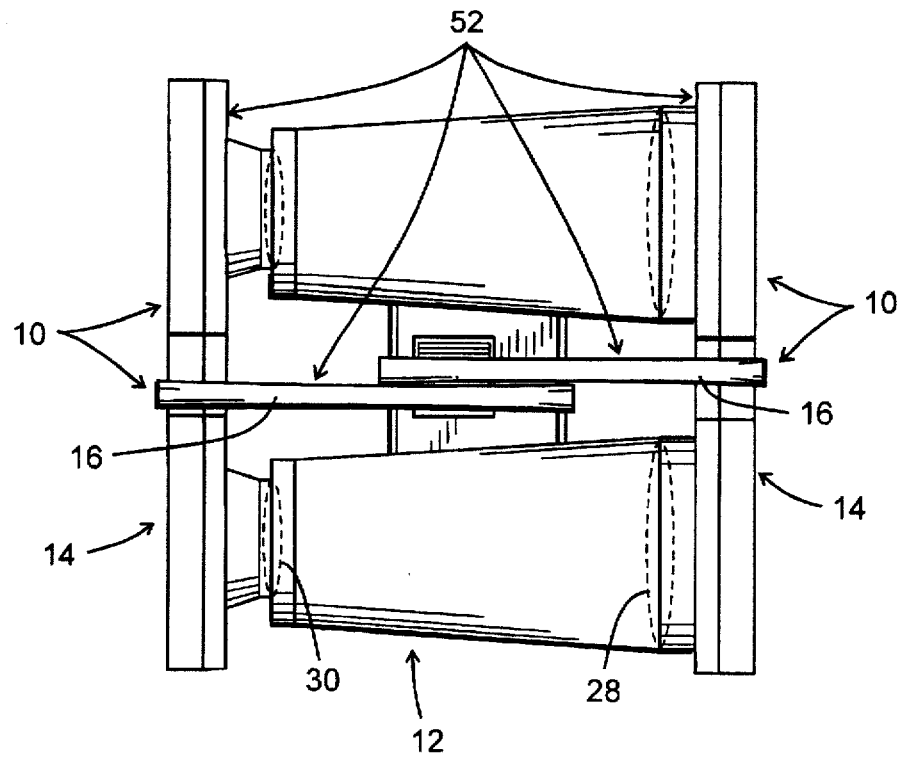
FIG. 9 shows a top plan view of a "squared-8" embodiment of a binocular lens protection set attached to binoculars so as to protect both the objective lenses and the eyepiece lenses.

FIG. 9 shows two binocular lens protectors 10 in position to protect both objective lenses 28 and eyepiece lenses 30 of binoculars 12.

Such an arrangement, a pair of binocular lens protectors 10 intended for use upon a single binoculars 12, forms a binocular lens protection set 52.

FIG. 10 shows a pair of binocular lens covers 14, in the rectilinear embodiment, intended to protect both objective lenses 28 and eyepiece lenses 30 of binoculars 12, and both binocular lens covers 14 are attached to each other and to binoculars 12 by a single elastic coupler 16.

Such an arrangement, a pair of binocular lens covers 14 and a single elastic coupler 16, forms a binocular lens protection system 54.

In summary, the present invention provides for an improved binocular lens protector 10. In the preferred embodiments, binocular lens protector 10 provides improved protection of the lenses of binoculars 12 as binocular lens protector 10 is easier to use and allows a user to maintain binocular lens protection until binoculars 12 are actually to be used for viewing, and further precludes the loss of binocular lens protection as binocular lens protector 10 cannot be lost or misplaced as it is elastically coupled to binoculars 12.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A binocular lens protector for binoculars having two bodies, lenses at ends of both of said bodies, and a line of sight associated therewith, said protector comprising:

a binocular lens cover; and an elastic coupler for movably attaching said binocular lens cover to said binoculars so that said binocular lens cover is movable from a first position perpendicular to said line of sight and against an end of the binoculars to a second position parallel to said line of sight and held against both of said bodies of said binoculars.

2. A binocular lens protector as claimed in claim 1 wherein said binocular lens cover comprises:

a rigid support structure;

a resilient structure; and wherein said rigid support structure is coupled to said resilient structure.

3. A binocular lens protector as claimed in claim 2 wherein said rigid support structure is fabricated from a single piece of a rigid material.

4. A binocular lens protector as claimed in claim 2 wherein said resilient structure rests against said binoculars when said binocular lens cover is in said first position.

5. A binocular lens protector as claimed in claim 1 wherein said binocular lens cover comprises a rigid support structure fabricated as a single piece from a rigid material with sufficient resiliency to preclude the need for a separate resilient material.

6. A binocular lens protector as claimed in claim 1 having at least one centrally located notch in said binocular lens cover, said notch guiding said elastic coupler into a central position on said binocular lens cover.

7. A binocular lens protector as claimed in claim 1 wherein outer edges of said binocular lens cover correspond in shape to at least outer edges of said binoculars.

8. A binocular lens protector as claimed in claim 1 wherein said binocular lens cover is shaped to resemble a figure "8".

9. A binocular lens protector as claimed in claim 1 wherein said binocular lens cover comprises:

a rigid support structure fabricated as a single piece from a rigid material with sufficient resiliency to preclude the need for a separate resilient material; and a screw hook centrally installed into said rigid support structure and used to connect said binocular lens cover to said elastic coupler.

10. A binocular lens protector as claimed in claim 1 wherein said binocular lens cover comprises:

a rigid support structure fabricated as a single piece from a material made rigid by its form;

a screw hook;

wherein said screw hook is centrally installed into said rigid support structure; and wherein said screw hook is used to connect said binocular lens cover to said elastic coupler.

* * * * *